VARACTOR HUE CONTROL

Filed Aug. 30, 1966

INVENTOR:
THEODOR M. WAGNER,

United States Patent Office 3,504,110

Patented Mar. 31, 1970

3,504,110

VARACTOR HUE CONTROL

Theodor M. Wagner, Garland, Tex., assignor to General Electric Company, a corporation of New York Filed Aug. 30, 1966, Ser. No. 576,138
Int. Cl. H04n 5/44
U.S. Cl. 178—5.4 6 Claims

ABSTRACT OF THE DISCLOSURE

Improved hue control means for a color television receiver. The control means comprises an oscillator for generating a color reference signal having the same frequency and phase as repetitive bursts of oscillations transmitted as a component part of the color television signal. The color reference signal generating oscillator is coupled to a phase shifting circuit which can vary the phase of the generated color reference signal relative to the repetitive burst. The phase shifting circuit includes a semiconductor device or varactor having a capacitance that is proportional to the magnitude of a reverse biasing voltage applied across it by a D-C voltage source and a variable resistor for varying the magnitude of the applied D-C voltage whereby the capacitance of the semiconductor device and, thus the phase of the oscillator generated color reference signal, can be varied.

Figure 1:
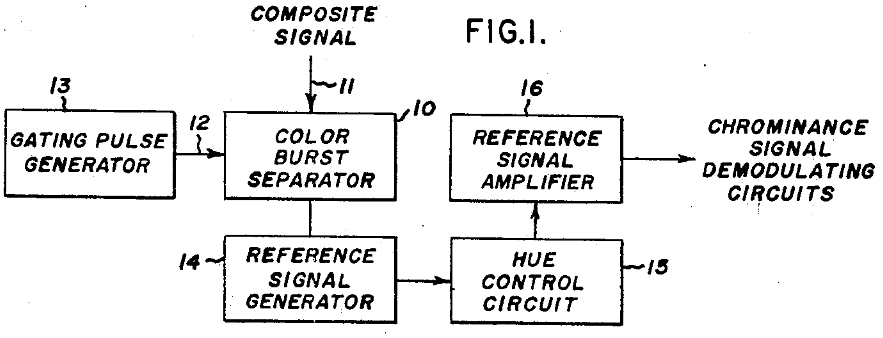

The present invention relates to color television receivers and more particularly to a hue control circuit for use in such receivers.

The transmitted video signal in a standard color television system includes a luminance signal similar to that transmitted in a monochrome television system, a chrominance or color subcarrier signal, horizontal and vertical synchronizing pulses, horizontal and vertical blanking pulses, and a color burst signal which consists of several cycles of the color subcarrier frequency. In practice, each color burst follows a horizontal blanking pulse or is located on the "back porch" of the pulse. The chrominance signal is transmitted as the side bands of a subcarrier wave having a frequency corresponding to one of the higher luminance video signal frequencies. The phase of the chrominance signal is modulated in accordance with the hue of the colors being telecast. In a television receiver, the chrominance signal is demodulated by a phase detector to produce color difference signals, which, when added to the luminance signal, produce a televised image having colors with the same hue as those viewed by the television camera. The demodulation of the chrominance signal is carried out by mixing that signal with a color reference signal. The phase relationship of the two signals determines the form of the color difference signal and therefore the hue of the televised image. The phase of the color reference signal is determined by the color bursts.

Frequently, a viewer may want to adjust the hue of the televised image either to compensate for phase distortion arising during transmission of the television signal or to produce a televised image which satisfies his personal taste.

In one known type of circuit, hue adjustment is afforded by connecting a variable capacitor across the circuits in which the color reference signal is generated. By varying the magnitude of the capacitor, the phase of the generated signal may be shifted through a small angular range. The variable capacitor for such tuning is relatively expensive and is usually operated through an expensive mechanical coupling between the capacitor and the control panel of the television receiver.

In another known type of prior art circuit, hue adjustment is provided by connecting a variable resistor across part of resonant circuitry in which the color reference signal is generated. As the magnitude of the resistor is varied, the effective magnitude of the reactive elements in the resonant circuit are also varied, thereby affecting the phase of the generated signal. The variable resistor is usually located at a convenient panel on the television receiver cabinet and is connected to the resonant circuit through a length of shielded cable. This arrangement has not proven completely satisfactory since the cable's capacitance tends to decrease the range over which the phase of the reference signal may be varied whereas the potentiometer tends to lower the Q of the resonant circuit.

A third type of known circuit utilizes a variable capacitor mounted at the end of a shielded cable. This circuit is subject to many of the faults of the circuit wherein a variable resistor is located at the end of a shielded cable.

To overcome these and other deficiencies in the prior art, the present invention provides an oscillator for generating a color reference signal having the same frequency and phase as repetitive bursts of oscillations transmitted as a component part of a color television signal. The oscillator is coupled to a phase shifting circuit which can vary the phase of the color reference signal relative to the repetitive bursts of oscillations. This phase shifting circuit includes a semiconductor device, the capacitance of which is proportional to the magnitude of the voltage with which the device is reversed biased. Means are provided for applying a reverse biasing voltage across the semiconductor device as are means for varying the magnitude of the applied voltage so that the capacitance of the device and the phase of the generated color reference signal may be easily varied.

Figure 2:
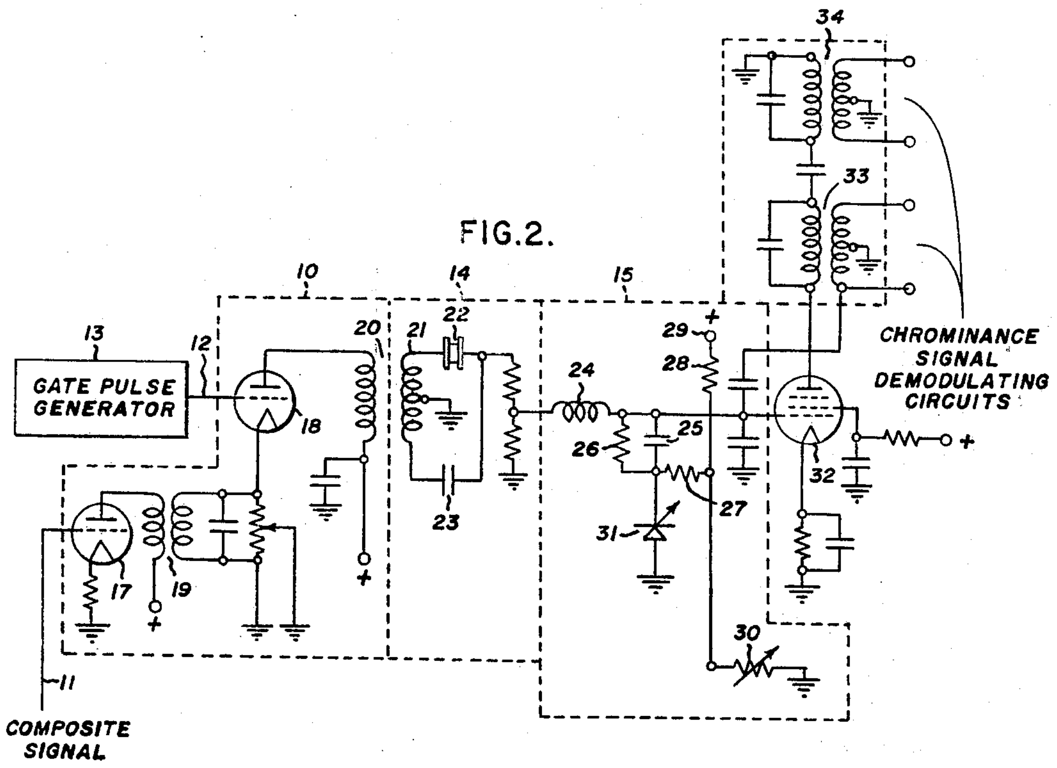

While the specification concludes with claims particularly pointing out and distinctly claiming that which is regarded as the present invention, the details of that invention along with its further objects and advantages may be more readily ascertained from the following detailed description when read in conjunction with the accompany drawing in which:

FIGURE 1 is a block diagram of certain circuits within a color television receiver, and FIGURE 2 is a schematic diagram showing the details of the circuits revealed in FIGURE 1.

In FIGURE 1, a color burst separator 10 has a first input terminal 11 at which a composite signal is applied and a second input terminal 12 at which gating pulses developed in a gating pulse generator 13 are applied. The gating pulses cause the color burst separator to separate each color burst from the horizontal blanking pulse which it follows. The output of the color burst separator 10 is an A-C waveform consisting of 8–10 cycles of the color subcarrier frequency, approximately 3.58 megacycles. The separated color burst is applied to a reference signal generator 14 which is resonant at the subcarrier frequency and produces a continuous A-C wave having that frequency. The reference signal produced in the generator 14 is applied to a hue control circuit 15 where its phase may be varied relative to the color bursts so as to alter the hue of the televised picture. The output of the hue control circuit 15 is amplified by a reference signal amplifier 16 before being applied to chrominance signal demodulating circuits.

Referring now to FIGURE 2, there will be seen schematic diagrams for certain of the circuits shown in FIGURE 1. The composite signal is amplified by a triode 17 and is inductively coupled to the cathode of a second triode 18 through an intermediate transformer 19. The gate pulse generator 13 provides a gate pulse at the grid 12 of the triode 18 to render that triode conductive only during the time the color burst contained in the composite signal is being applied to the cathode of the triode 18. As a result, the color burst is amplified and is inductively coupled to the reference signal generator 14 through transformer 20.

The secondary winding 21 of the transformer 20 forms a part of a resonant circuit including a piezoelectric crystal 22 and a capacitor 23. The magnitude of the capacitor 23 may be varied so that the piezoelectric crystal "rings" when a color burst is induced in the secondary winding 21. The effect of this "ringing" is to produce a color reference signal, i.e., continuous oscillations having the same frequency and phase as the color bursts. The Q characteristic of the resonating circuit is relatively high since there are no resistances in the circuit. Thus, there is little attenuation in the continuous oscillations between the times the color bursts are applied to the resonating circuit.

The color reference signal is applied to the hue control circuit 15 through an impedance-matching inductance 24. The hue control circuit 15 includes a fixed capacitor 25 connected to one end of the inductance 24 in parallel with a grid leak resistor 26. A T-shaped impedance network in the hue control circuit 15 includes a resistor 27 connected to the common junction at the lower end of the resistor 26 and capacitor 25, a resistor 28 connected to a positive D–C voltage source 29, and a variable resistor or potentiometer 30. In one embodiment of the invention, the potentiometer 30 is adapted for use as remote control and is thus connected to the junction of the resistors 27 and 28 through an insulated wire external to the television receiver.

A voltage variable capacitor or varactor 31 is effectively connected in parallel with the voltage divider consisting of resistors 28 and 30. The varactor 31 is a silicon semiconductor diode which, when reversed biased, has a capacitance across its junction which may be utilized as a circuit element. The capacitance is a function of the reverse voltage applied across the varactor and is determined in accordance with the following formula:

$$C=\frac{C_0}{\sqrt[3]{1-V/a}}$$

where $C_0$ is the capacitance at zero voltage, V is the magnitude of the reverse biasing voltage, and $a$ is a constant dependent on the structure of the varactor, but typically approximately 0.32 volts at room temperature.

When the magnitude of the potentiometer 30 is varied by a suitable manual control, the proportion of the voltage from the D–C voltage source 29 which is dissipated across that potentiometer varies as does the magnitude of the voltage applied across the varactor 31. Consequently, the capacitance which exists at the junction of the varactor 31 also varies. Since the capacitance is in the path of the color reference signal, it alters the phase of that signal by an amount proportional to the magnitude of the capacitance. The extent of the phase alteration is determined by the viewer who manipulates the manual control for potentiometer 30 while viewing the image on the television screen. To assure that the change in phase of the color reference signal is linearly related to the change in position of the manual control for potentiometer 30, it may be necessary to form the potentiometer 30 in such a way that a change in the position of the manual control causes a nonlinear change in the magnitude of the potentiometer 30. The phase altered signal is applied to the signal grid of a subcarrier amplifier tube 32 which amplifies the altered signal and delivers it to the primary windings of transformer 33 and 34. The secondary windings of these transformers lead to the chrominance signal demodulating circuits, the functions of which are described above.

While there has been described at present what is regarded as a preferred embodiment of the present invention, it is obvious that variations and modifications therein will occur to those skilled in the art. Therefore, it is intended that the appended claims shall cover all such variations and modifications as fall within the true spirit and scope of the invention.

What I claim as new and desire to secure by Letters Patent of the United States is:

1. In a color television receiver adapted to receive a composite color television signal including a subcarrier signal for conveying chrominance information and a color burst signal comprising repetitive bursts of oscillations at the frequency of the subcarrier signal, the combination comprising:

(a) an oscillator for generating a color reference signal having the same frequency as and being in phase with the repetitive bursts of oscillations;

(b) a phase shifting circuit electrically connected to said oscillator for varying the phase of the color reference signal generated therein relative to the repetitive bursts of oscillations, said phase shifting circuit including (1) a semiconductor device having a capacitance proportional to the magnitude of a reverse biasing voltage applied across said device, (2) a biasing means for applying a reverse biasing voltage across said device, and (3) means for varying the magnitude of the reverse biasing voltage whereby the capacitance of said device and the phase of the color reference signal may be varied.

2. A color television receiver as recited in claim 1 wherein said biasing means in said phase shifting circuit includes a D-C voltage source, a voltage divider having serially connected first and second impedances, said first impedance being connected at one end to said D-C voltage source and at the other end to a common junction of one end of said second impedance and one terminal of said semiconductor device.

3. A color television receiver as recited in claim 2 wherein said second impedance comprises a resistance element having a manually changeable magnitude.

4. A color television receiver as recited in claim 3 wherein said second impedance is adapted for use at a location remote from said receiver by connecting the one end of said second impedance to the common junction through a long conductive wire.

5. A color television receiver as recited in claim 3 wherein said semiconductor device comprises a silicon diode.

6. A color television receiver as recited in claim 5 wherein the capacitance across the junction of said silicon diode is determined in accordance with the following formula:

$$C=\frac{C_0}{\sqrt[3]{1-V/a}}$$

where $C_0$ is the capacitance at zero voltage, V is the magnitude of the reverse biasing voltage, and $a$ is a constant dependent on the structure of said rectifier.

References Cited

UNITED STATES PATENTS

| | | | |
|---|---|---|---|
| 3,436,470 | 4/1969 | Konkel et al. | 178—5.4 |
| 3,260,968 | 7/1966 | Drapkin | 333—29 |
| 2,881,245 | 5/1959 | Fenton | 178—5.4 |
| 3,079,571 | 2/1963 | Elliott | 307—320 X |
| 3,213,450 | 10/1965 | Goor | 325—476 X |
| 3,354,397 | 11/1967 | Wittig | 334—15 X |

OTHER REFERENCES

A. E. Bakanowski, Diffused Silicon Nonlinear Capacitors, IRE transactions on electron devices, October 1959, pp. 384–390.

ROBERT L. GRIFFIN, Primary Examiner

J. C. MARTIN, Assistant Examiner